United States Patent [19]
Sismore

[11] 3,835,520
[45] Sept. 17, 1974

[54] TUBE PULLING APPARATUS
[75] Inventor: William W. Sismore, Willow Grove, Pa.
[73] Assignee: Richard T. Harris, Monroe, Mich., a part interest
[22] Filed: Sept. 10, 1973
[21] Appl. No.: 396,054

[52] U.S. Cl. .............................. 29/202 D, 29/427
[51] Int. Cl. ...................... B23p 15/26, B23p 19/02
[58] Field of Search......... 29/202 D, 202 R, 200 D, 29/427

[56] References Cited
UNITED STATES PATENTS
3,628,246   12/1971   Bronne et al. ............... 29/427 X Primary Examiner—Thomas H. Eager
Attorney, Agent, or Firm—Owen & Owen

[57] ABSTRACT

The invention is a tube pulling apparatus capable of removing a tube from a pair of tube sheets of a tube-in-shell heat exchanger. A hydraulic cylinder retracts a pull rod which expands a set of gripping jaws against the interior of a tube in a tube sheet. The pull rod then continues to retract while a standoff collar braces the apparatus against the tube sheet. Sufficient force is developed to overcome the hoop stresses of the tube in the tube sheet, and the stressed tube portion is pulled free of the tube sheet without damage to the tube sheet.

8 Claims, 4 Drawing Figures

3,835,520
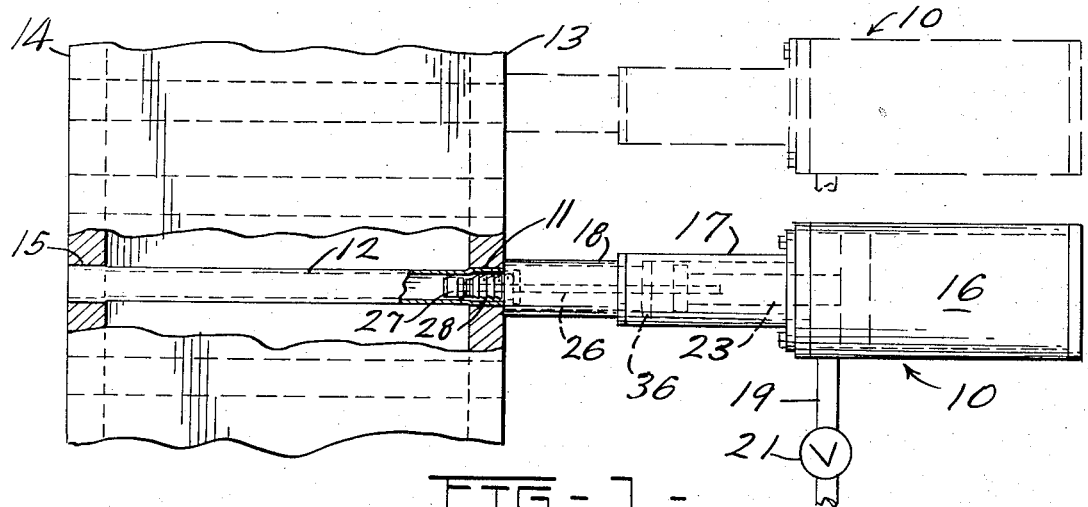
FIG-1-
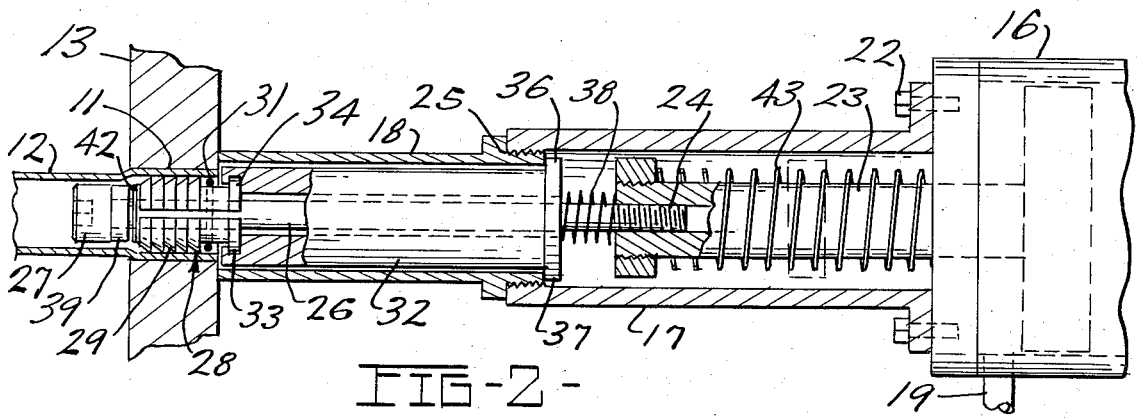
FIG-2-
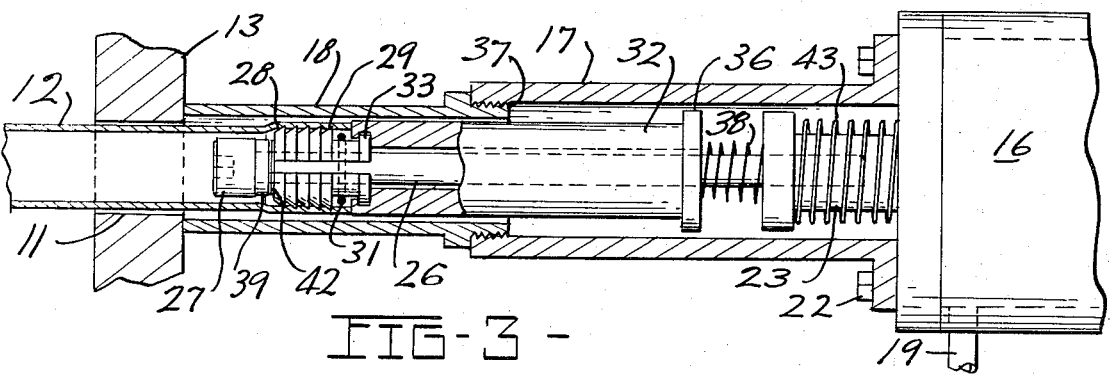
FIG-3-
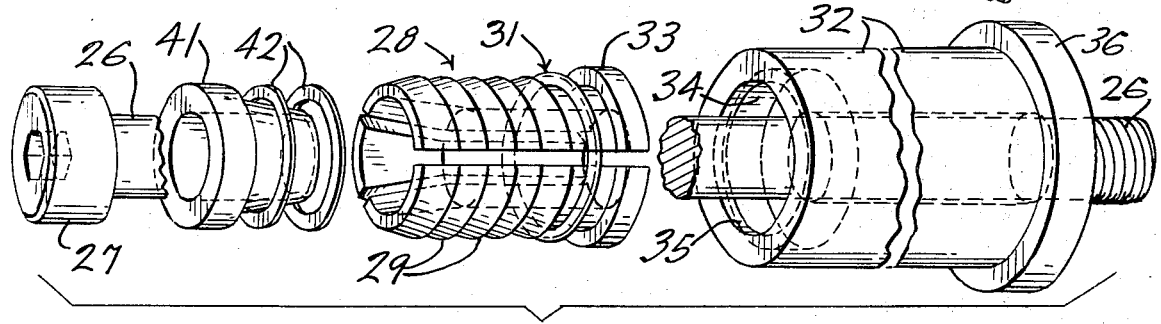
FIG-4-

3,835,520

TUBE PULLING APPARATUS

BACKGROUND OF THE INVENTION

The invention relates to apparatus for removal of tubes from a tube sheet of, for example, a heat exchanger or boiler.

In many installations such as tube-in-shell heat exchangers and boilers employing tubes therein, it is often necessary to remove tubes from the tube sheet in which they are mounted. This may be necessary for various reasons such as leaks in the tubes or excessive scale formations therein.

Ordinarily the tubes are expanded into engagement with the tube sheets and are securely sealed therein by the hoop stresses created by the expanding process. Often the tube sheet sealing surface has serrations to increase sealing strength. In order to remove the tube from the tube sheets, it is necessary to either relieve or overcome the hoop stresses in the tube and tube sheets. This may be accomplished in various ways, such as, for example, by the method and apparatus of U.S. Pat. No. 3,628,246. The method of this patent involves relieving of the hoop stress in the tube by the axial cutting into the hoop stressed portion of the tube to remove material. However, this and other existing methods involving cutting into the tube must be done with extreme caution to prevent damage to the tube sheet, since any damage thereto could result in a defective seal between the tube sheet and the replacement tube. Even if the cutting process can be accomplished without damage to the tube sheet, the process is necessarily slow and requires especially designed equipment to be used by a skilled operator.

SUMMARY OF THE INVENTION

The present invention provides an apparatus for quickly and efficiently removing the hoop stressed portion of a tube from a tube sheet without danger of damage to the internal sealing surface of the tube sheet. The apparatus enables an operator to axially extract the tube from the outer side of the tube sheet by inserting a gripping portion of the apparatus into the end of the tube, actuating the tool to grip the inside surface of the tube, and thence automatically pulling the gripped tube outwardly. This is accomplished by a tool which includes a hydraulic cylinder, which develops sufficient pulling power to overcome the hoop stress friction of a tube in a tube sheet. Connected to the hydraulic cylinder is an internal gripping jaw for grasping the interior of the tube end. A standoff sleeve braces the apparatus against the face of the tube sheet as the cylinder is activated. First the gripping jaw is expanded to bite into the interior of the tube end, then the jaw is retracted a sufficient distance to remove the sealed portion of the tube, overcoming the hoop stress friction. For tube sheets of considerable separation, the tube should generally be cut between the tube sheets to separately remove each end, since the tube intermediate the sheets is susceptible to stretching.

Once the expanded, stressed tube ends have been freed from their respective tube sheets, the remainder of the tube may be pulled out of the tube sheets by hand or by light pulling equipment.

BRIEF DESCRIPTION OF THE DRAWINGS

FIG. 1 is an elevational view of a tube pulling apparatus according to the invention, shown in position to engage a tube extending between a pair of parallel tube sheets;

FIG. 2 is an enlarged fragmentary sectional view of the apparatus of FIG. 1;

FIG. 3 is a view similar to FIG. 2 showing the apparatus engaging the tube end and retracting it from the tube sheet; and FIG. 4 is an exploded view indicating the manner of assembly of various parts of the apparatus.

DESCRIPTION OF A PREFERRED EMBODIMENT

Referring to FIG. 1 of the drawing, a tube pulling apparatus according to the invention, generally indicated by the reference number 10, is shown in position to engage an end 11 of a tube 12. The tube 12 is positioned in a pair of parallel tube sheets 13 and 14 of, for example, a heat exchanger. In accordance with conventional installation practice, the tube end portion 11 has been expanded into hoop stressed engagement with the tube sheet 13. The end portion 11 is shown, on an exaggerated scale, as being radially expanded within the tube sheet 13 to provide a tight seal with good thermal conductivity. Similarly, a portion 15 of the tube 12 is engaged within the opposite tube sheet 14.

The apparatus 10 includes a driving means 16, preferably comprising a single action hydraulic cylinder, from which extends a housing 17 and a standoff sleeve 18. A fluid supply line 19 having a valve 21 extends from the hydraulic cylinder 16 for connection to a fluid pump (not shown).

In FIG. 2 the apparatus 10 is shown in detail. The cylindrical housing 17 is affixed to the hydraulic cylinder 16 preferably by means of bolts 22. Extending into the housing 17 from the cylinder 16 is a pull rod 23 having a threaded bore 24 at one end with the other end secured to the piston cylinder. The housing 17 preferably has an internally threaded end 25 for threaded connection to the cylindrical standoff sleeve 18. The housing 17 and stand-off sleeve 18 are of suitable strength to accept large compressive forces and the diameter of the sleeve 18 is large enough to freely receive the extracted tube end 11. Referring to FIGS. 2 and 4, connected into the threaded bore 24 of the pull rod 23 is an elongate mandrel shank 26 with a head 27. The mandrel shank 26 may comprise a high strength machine bolt. A segmental gripping jaw 28 having a plurality of circumferential teeth 29 is situated circumjacent the shank 26, and an O-ring 31 is provided to retain the jaw segments together. Also circumjacent the shank 26 is a sliding jaw retainer 32 which is slidable within the stand-off sleeve 18. A collar 33 of the segmented jaw 28 resides within a recessed portion 34 of the sliding jaw retainer 32, and a lip 35 prevents migration of the jaw 28 from the retainer 32 when these components are assembled on the shank 26. At the opposite end of the jaw retainer 32 is a collar 36 abutting against an internal shoulder 37 on the standoff sleeve 18 to define maximum forward position of the jaw retainer 32 and segmented gripping jaw 28. Between the collar 36 and the pull rod 23 and encircling the mandrel shank 26 is a compression spring 38 for maintaining separation of the retainer 32 and rod 23 during gripping of the tube end 11.

To expand the segmented gripping jaw 28 into engagement with the tube end 11, a tapered wedge sleeve 39 having a collar 41 and spacers 42 is situated on the mandrel shank 26 adjacent the head 27 of the shank 26. Prior to engagement of the jaws, as in FIG. 2, the wedge sleeve 39 remains spaced from the gripping jaw 28, so that the jaw 28 remains relaxed for insertion into a tube end. The various components of the tube gripping mechanism are shown in detail in the exploded view of FIG. 4.

When the apparatus 10 is positioned at the outer surface of a tube sheet 13 as in FIG. 2, the tube end 11 is engaged by activation of the hydraulic cylinder 16. As the hydraulic fluid is admitted in the cylinder 16, to the left of its piston as shown, the pull rod 23 is retracted. The mandrel shank 26 is correspondingly retracted, bringing the tapered wedge sleeve 39 into expanding contact with the segmented gripping jaw 28. The jaw 28 and sliding jaw retainer 32 remain substantially at rest during this operation, biased forward by the compression spring 38, even though the pull rod 23 is retracting. Rearward movement of the wedge sleeve 39 will expand the jaw teeth radially outwardly to engage and embed the teeth 29 into the interior surface of the tube end 11 until the sleeve collar 41 or spacers 42 engage the end of the jaw 28. At this point the jaw 28, jaw retainer 32 and tube 12 begin to retract as the mandrel shank continues to retract, with the standoff sleeve 18 braced for compression against the tube sheet 13. The jaw 28 will not slip out of the tube end 11 because of the forceful biting grip of the teeth 29 in the tube end 11. It should be noted that the teeth 29 are stepped or angled in a rearward direction so that they will embed themselves into the relatively soft metal of the tube end 11 upon the initial rearward motion of the pull rod 23 and its associated parts.

When the pull rod 23 and mandrel shank 26 have retracted to the full throw of the hydraulic cylinder 16, which is approximately the position of FIG. 3, the tube end 11 has been drawn into the standoff sleeve 18, clear of the tube sheet 13. At this point the tube pulling apparatus 10 may be removed by shutting off the fluid pump (not shown) and relieving the pressure on the fluid in the hydraulic cylinder 16 and the supply line 19. A strong compression spring 43, which has been compressed during tube pulling as shown in FIG. 3, pushes the pull rod 23 and the mandrel shank 26 forward while the apparatus 10 is pulled back away from the tube sheet 13. Fluid is forced out of the cylinder 16 back through the supply hose 19. Thus, only one fluid transfer hose need be coupled to the cylinder 16. However, it will be apparent that a double-acting cylinder with appropriate hydraulic controls could be used with the instant apparatus if desired. For example, a series of hydraulic rams currently available from Owatonna Tool Company of Owatonna, Minn. are suited for this purpose. Single-acting and double-acting rams having a stroke from 2½ to 5 inches and a capacity of up to 60 tons at a hydraulic pressure of about 10,000 psi are available and suitable for use with this invention.

When the sliding jaw retainer 32 has returned to its full forward position, the mandrel shank 26 continues to be pushed forward by the pull rod 23, thus releasing the expansive force of the wedge sleeve 39 on the gripping jaw 28. This allows the teeth 29 to disengage from the tube end 11, partially aided by the O-ring 31, and the apparatus 10 may be removed from the tube 12.

The spacers 42 on the wedge sleeve 39 may be added to or decreased in number to adjust the diameter to which the gripping jaw 28 expands. A greater number of spacers 42 will reduce the distance that the wedge sleeve 39 can travel into the gripping jaw 28, thus decreasing the fully expanded diameter of the jaw 28. Fewer spacers 42, of course, will have the opposite effect. This adjustability is important, since the jaw 28 must be adjusted so that the teeth 29 bite into the tube end 11 sufficiently to remove the tube 12 without slippage, but cannot be expanded to such an extent that the teeth 29 bite through the tube end 11 and into the sealing surface of the tube sheet 13. Of course, other means of adjustment may be provided, such as a threaded connection between the collar 41 and the remainder of the wedge sleeve 39.

The tube end 11, which has usually been cut off from the major length of the tube 12, may be removed by hand or by light pulling equipment, since the normal tube diameter is smaller than that of the hoop stressed portion. To remove the remainder of the tube, the operation is repeated on the opposite tube sheet 14 and the length of the tube 12 can then be removed by hand or light pulling equipment.

The above described preferred embodiment provides a tube pulling apparatus which is compact and very efficient in operation. The apparatus is capable of removing tubes from a tube sheet very quickly with virtually no slippage of the gripping mechanism and with no damage to the sealing surfaces of the tube sheet. Various other embodiments and alterations to this preferred embodiment may be made without departing from the spirit and scope of the following claims.

What I claim is:

1. Apparatus for removing a tube from a tube sheet, comprising:
    a radially expansible gripping jaw for insertion into the tube;
    means for radially expanding said jaw into internal engagement with the tube;
    power pulling means connected to said jaw for pulling said jaw away from the tube sheet; and
    standoff means for bracing said power pulling means against the tube sheet.

2. The apparatus of claim 1, wherein said expanding means comprises a conical wedge sleeve adjacent said gripping jaw, said wedge sleeve being drivingly connected to said power pulling means.

3. The apparatus of claim 1, wherein said power pulling means comprises a single action hydraulic cylinder having means for connection to a hydraulic pump, and a mandrel shank drivingly connected to said cylinder and to said segmental gripping jaw.

4. The apparatus of claim 3, wherein said single action hydraulic cylinder includes bias means for returning said mandrel shank from a pulled position to a normal extended position.

5. The apparatus of claim 3, which further includes bias means for holding said segmental gripping jaw in position within the tube until said jaw has been expanded into engagement with the tube.

6. The apparatus of claim 1, wherein said segmental gripping jaw includes a plurality of angularly disposed biting teeth.

7. The apparatus of claim 1, which further includes adjustable means for limiting the extent of radial expansion of said jaw within the tube.

8. Apparatus for removing a tube from a tube sheet, comprising:
    a mandrel shank having a forward head;

a tapered wedge sleeve positioned circumjacent said shank and adjacent said head;

an expansible segmented gripping jaw disposed around said shank and spaced from said tapered wedge sleeve;

means connected to said mandrel shank for first pulling said tapered wedge sleeve toward said jaw until said jaw expands into internal engagement with the tube and, then pulling said jaw with said shank to remove the tube from the tube sheet;

standoff means for bracing said power pulling means against the tube sheet; and bias means for holding said jaw in position within the tube while said jaw is being expanded.

* * * * *